United States Patent [19]

Ruggles et al.

[11] Patent Number: 5,017,022
[45] Date of Patent: May 21, 1991

[54] HIGH TEMPERATURE BEARING

[75] Inventors: John F. Ruggles, Phoenix; Gary L. Boyd, Tempe, both of Ariz.

[73] Assignee: Allied-Signal, Inc., Morris Township, Morris County, N.J.

[21] Appl. No.: 535,226

[22] Filed: Jun. 7, 1990

Related U.S. Application Data

[63] Continuation of Ser. No. 269,215, Nov. 9, 1988, abandoned.

[51] Int. Cl.⁵ .................................. F16C 32/06
[52] U.S. Cl. .................... 384/100; 384/118; 384/907.1
[58] Field of Search ............. 384/100, 114, 117, 118, 384/119, 111, 907, 907.1, 912, 913

[56] References Cited

U.S. PATENT DOCUMENTS

| | | | |
|---|---|---|---|
| 1,595,744 | 8/1926 | Trumpler . | |
| 2,538,746 | 1/1951 | Dall | 308/73 |
| 2,660,484 | 11/1953 | Gerard et al. . | |
| 2,683,635 | 7/1954 | Wilcox . | |
| 2,879,111 | 3/1959 | Heinrich et al. . | |
| 2,884,282 | 4/1959 | Sixsmith . | |
| 3,030,744 | 4/1962 | Mueller . | |
| 3,070,406 | 12/1962 | McKenney . | |
| 3,107,129 | 10/1963 | Brown . | |
| 3,205,028 | 9/1965 | Mech et al. | 308/73 |
| 3,284,144 | 11/1966 | Moore et al. . | |
| 3,428,374 | 2/1969 | Orkin et al. . | |
| 3,433,542 | 3/1969 | Tonooka et al. . | |
| 3,437,387 | 4/1969 | Dee | 308/22 |
| 3,608,170 | 9/1971 | Larson et al. . | |
| 3,639,014 | 2/1972 | Sixsmith | 308/9 |
| 3,680,932 | 8/1972 | Raimondi . | |
| 3,687,506 | 8/1972 | Dee | 308/9 |
| 3,726,572 | 4/1973 | Beardmore | 308/9 |
| 3,944,304 | 3/1976 | Purtschert | 308/9 |
| 3,951,475 | 4/1976 | Okano et al. | 308/9 |
| 3,985,405 | 10/1976 | Okano et al. | 308/9 |
| 4,184,720 | 1/1980 | Zacherl | 384/109 |
| 4,274,683 | 6/1981 | Gray et al. . | |
| 4,410,285 | 10/1983 | Strasser et al. | 384/278 |
| 4,560,290 | 12/1985 | Siebert | 384/434 |
| 4,678,348 | 7/1987 | Tielemans et al. | 384/114 |
| 4,759,644 | 7/1988 | Mizukusa et al. | 384/907.1 |
| 4,824,262 | 4/1989 | Kamigaito et al. | 384/42 |

FOREIGN PATENT DOCUMENTS

| | | | |
|---|---|---|---|
| 0227991 | 8/1987 | European Pat. Off. . | |
| 0262939 | 6/1988 | European Pat. Off. . | |
| 57-15121 | 1/1982 | Japan | 384/100 |
| 1562511 | 3/1980 | United Kingdom . | |
| 2197915 | 6/1988 | United Kingdom | 384/100 |

Primary Examiner—Thomas R. Hannon
Attorney, Agent, or Firm—James W. McFarland; Jerry J. Holden; Robert A. Walsh

[57] ABSTRACT

A non-lubricated, gas film load support bearing wherein the rotating shaft is of ceramic material such as silicon nitride, and the surrounding bearing segments are of carbon-graphite material. The carbon-graphite surface is configured with lands and depressions for self-generation of the gas film from surrounding, hot, oxygen-bearing gases.

11 Claims, 2 Drawing Sheets

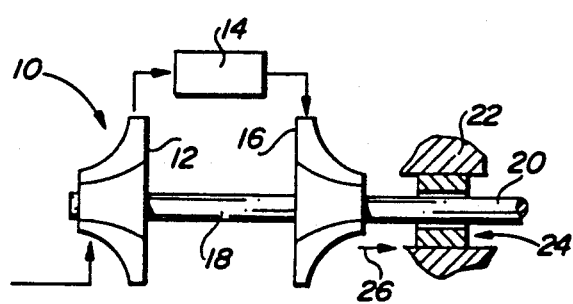
FIG. 1
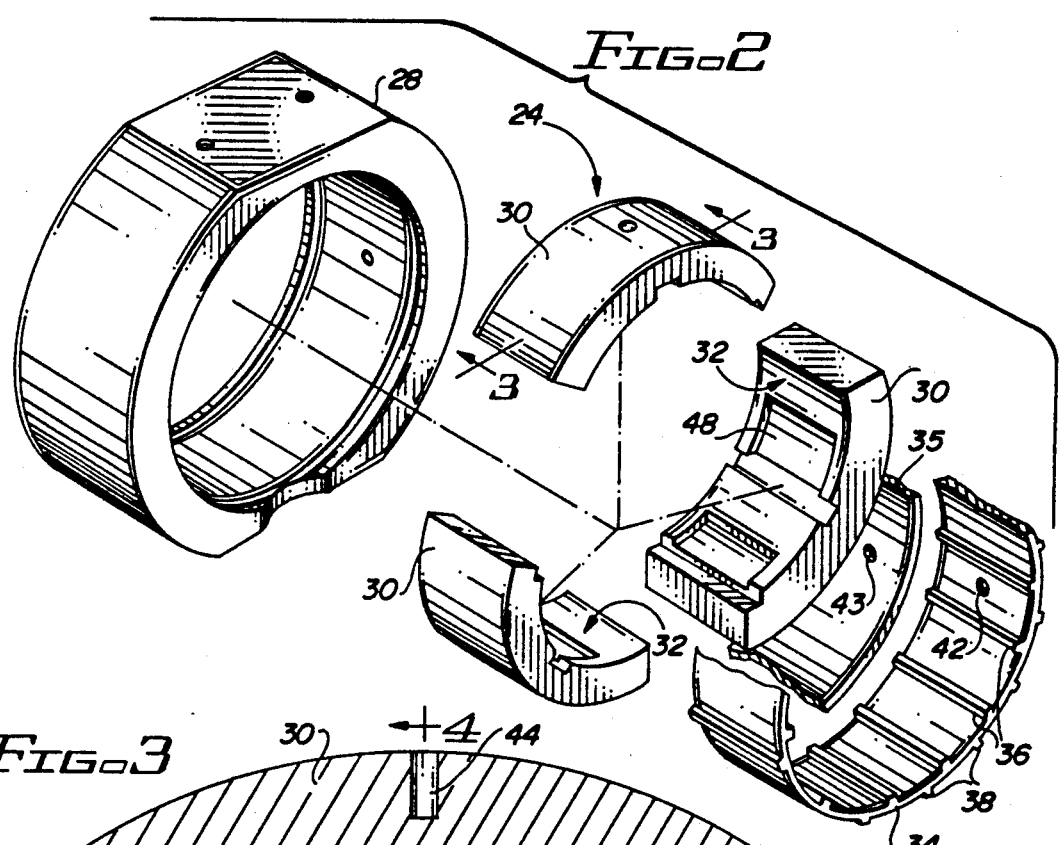
FIG. 2
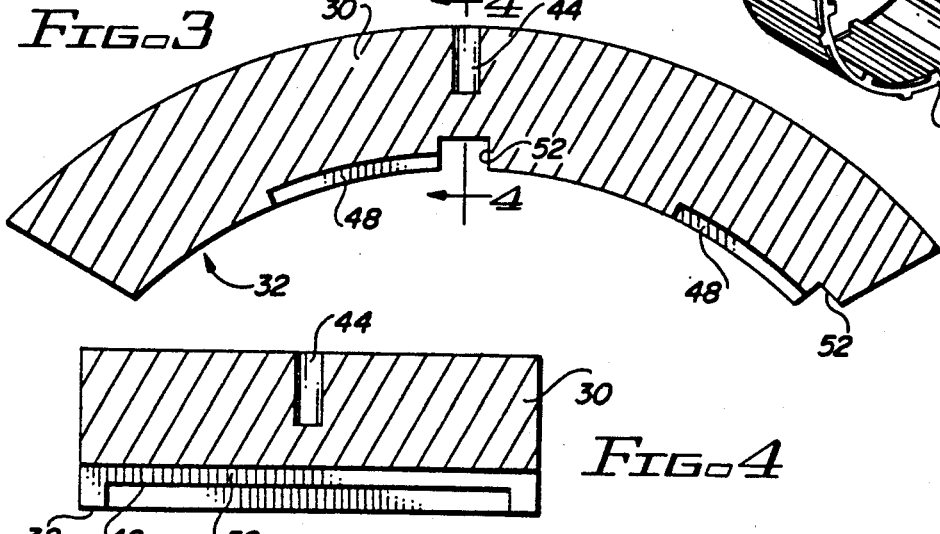
FIG. 3
FIG. 4

HIGH TEMPERATURE BEARING

This application is a continuation of application Ser. No. 07/269,215 filed 11-09-88 now abandoned.

TECHNICAL FIELD

This invention pertains to high speed bearings such as utilized in gas turbomachinery and as may be disposed in a hot gas, oxygen bearing environment. More particularly the invention relates to an improved bearing utilizing the surrounding gas environment to develop a gas film load support without requirements for lubrication.

BACKGROUND OF THE INVENTION

Increase in efficiency in certain rotating equipment such as gas turbomachinery is dependent upon increased temperature operational characteristics. Oil lubricated bearings inherently have a limited temperature capability which constrains such rotating machinery design either to limited temperature operation or bearing structure location at a lower temperature environment.

Gas bearings offer the capability of operating in a higher temperature environment inasmuch as an oil lubrication system is not required. A characteristic problem of such non-lubricated bearings is that of dry wear at high pressure-velocity (PV) numbers. This is a serious limit to the load carrying capacity of such bearings, especially for extremely high speed operation.

While the present invention, as described in greater detail below, may present an appearance generally similar to the pivoted pad type of journal bearings, significant structural and operational distinctions therefrom are incorporated in the present invention. More particularly, pivoted pad or tilting pad type bearings are based upon a design concept that presents a very closely defined bearing surface which generates a "wedge" shaped configuration to generate a hydrodynamic film of oil lubrication between the bearing surface and the member being supported. Such prior art arrangements not only require very carefully controlled radii, but also must have a carefully located pivot point for the bearing pads in order to achieve successful operation. Examples of such pivoted pad type prior art bearings may be found in U.S. Pat. Nos. 1,595,744; 2,538,746; 3,205,028; 3,687,506; 3,944,304; 3,985,405; and 3,951,475.

SUMMARY OF THE INVENTION

The present invention contemplates an improved high speed bearing construction which does not require oil lubrication flow and is yet operable in extreme conditions of very high operating temperatures in an oxygen bearing gas environment. To this end one of the adjacent bearing surfaces is ceramic, while the other adjacent surface is a high temperature carbon-graphite material. The ceramic surface has a very smooth surface finish of about 8 micro inches, and the carbon-graphite material is selected to withstand high temperatures. The ceramic material has an extremely low coefficient of thermal expansion minimizing thermal distortion in the bearing. The carbon-graphite material is chosen to have a design temperature operational capability in the range of about 1,000° to 1,200° F. The carbon-graphite material also has a very low coefficient of friction which dramatically reduces starting or breakout torque for the rotating machinery being supported by the improved bearing.

The present invention further contemplates such a bearing wherein a gas film support is continuously self-generated from the flow of ambient gas therearound by incorporation of shrouded pockets or recesses in the carbon graphite surface. The recesses or pockets are configured and arranged so as to generate the load support film between the adjacent bearing surfaces. The present invention accomplishes creation of the self-generating load bearing support film of gas, but without introduction of the prior art, pivoted-pad type bearings and their very carefully created wedge-shaped spaces.

In a preferred arrangement the carbon graphite portion of the bearing is comprised of a plurality, such as three, bearing segments surrounding a rotating ceramic shaft, with the bearing segments being uniformly, radially inwardly biased by a backing spring. Importantly, the bearing of the present invention avoids pivoting of the carbon graphite bearing segments toward and away from the ceramic rotating shaft. Backing springs may be utilized for the uniform radially inward preload upon the carbon graphite segments in order to stabilize the bearing at the desired operating speed, i.e. outside any critical speeds.

These and other objects and advantages of the present invention are specifically set forth in, or will become apparent from the following detailed description of a preferred arrangement of the invention, when read in conjunction with the accompanying drawings.

BRIEF DESCRIPTION OF THE DRAWINGS

FIG. 1 is a schematic representation, with portions shown in cross section, of a gas turbomachine embodying the present invention;

FIG. 2 is an exploded perspective view of various components of the improved bearing of the present invention;

FIG. 3 is an elevational cross sectional view of one of the bearing segments as viewed generally along lines 3—3 of FIG. 2;

FIG. 4 is a plan cross sectional view taken along lines 4—4 of FIG. 3;

DETAILED DESCRIPTION OF THE PREFERRED EMBODIMENT

Figure 5:
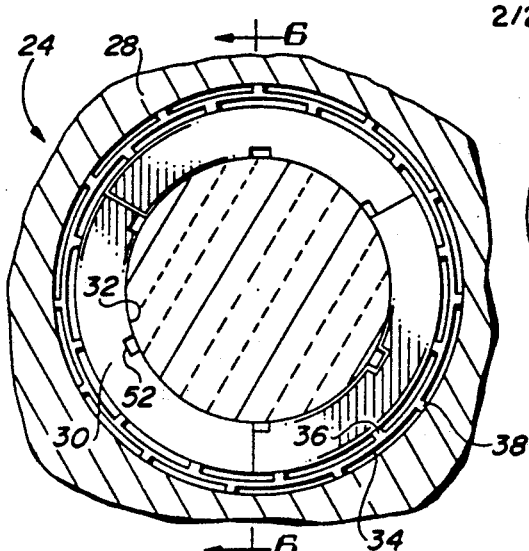
FIG. 5 is a plan cross sectional view of the bearing assembly.

Referring now more particularly to the drawings, rotating machinery in the form of a gas turbomachine or gas turbine engine (10) is illustrated schematically in FIG. 1. The engine (10) generally includes a compressor (12) supplying compressed air to a combustor (14) wherein the temperature and pressure of the flowing gas is increased by combustion processes. The exhausting combustion gas is directed across a turbine (16) to impart mechanical energy thereto and rotate the latter. Illustrated is a shaft (18) interconnecting the turbine and compressor to drive the latter. One portion (20) of the shaft is schematically illustrated as surrounded by a stationary housing (22), with a bearing assembly (24) as contemplated by the present invention disposed between the rotating shaft (20) and the stationary housing (22). Bearing assembly (24) is disposed in a hot gas environment of the engine as illustrated by arrow (26) denoting a flow of an oxygen bearing hot gas on the order of 1,000° F. or so.

At least the section (20) of the shaft is comprised of a ceramic material such as silicon nitride or silicon carbide. More specifically, at least the outer surface of shaft (24) is ceramic. Utilization of ceramic components within gas turbomachinery is desirable in view of the high temperature capabilities of such material.

Referring now more particularly to FIGS. 2-7, the bearing assembly (24) is generally carried within stationary housing (22), such as within a stationary housing insert (28). The bearing assembly (24) includes a plurality of annular bearing segments, such as the three segments (30) each having a circumferential length of approximately 120°, which together present a substantially continuous circular bearing internal surface. More specifically, internal surfaces (32) are arranged and configured to closely fit against the outer ceramic surface of shaft section (20) for providing load support therefor. Each of the bearing segments is comprised of a high temperature carbon-graphite material capable of readily withstanding the hot gas temperature environment of 1,000° F. to 1,200° F. An example of suitable material for the bearing segments (30) is Poco graphite grade ACF-10QE, a product of Poco Graphite, Inc., Decatur, Tex.

Disposed in circumferentially surrounding relationship to the three bearing segments (30) is a continuous, biasing preload spring (34) located between the bearing segments (30) and the housing insert (28). Importantly, spring (34) is configured and arranged to provide a relatively uniform radially inwardly biasing force to the bearing segments (30) without inducing any pivoting of the latter. So long as this latter functional criteria is maintained, the spring (34) may be multi-piece (e.g., an identical section corresponding to each bearing segment) rather than continuous. Spring (34) illustrated is preferably a continuous ribbon having alternating upstanding ribs (36,38) on opposite sides thereof respectively engaging the bearing segments (30) and the housing insert (28) so that the resiliance of spring (34) radially inwardly biases the bearing segments (30) toward the centrally located shaft section (20). A thin compliant metal sheet (35) located between (34) and (30) prevents abrasion of the carbon graphite which may otherwise decrease the radial preload of spring (34). This sheet stock (35) may be welded to the inside diameter of spring (34) or otherwise sandwiched between segments (30) and the spring (34) to minimize abrasive action as may be caused by ribs (36).

Figure 6:
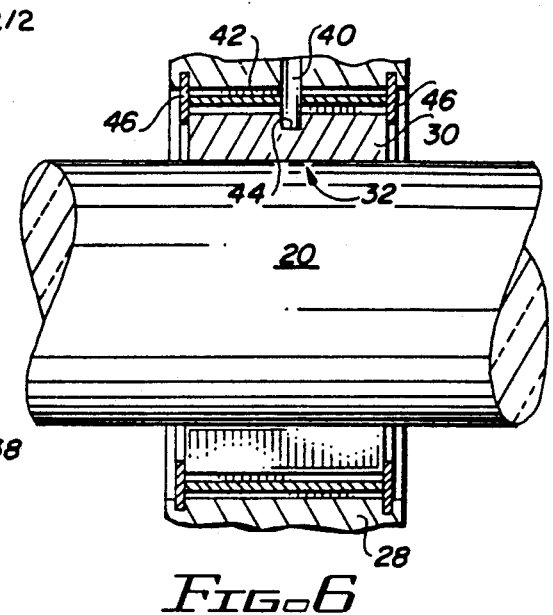
FIG. 6 is a cross sectional view taken along lines 6—6 of FIG. 5.

To further assist in preventing pivoting action of the three bearing segments (30), as well as to firmly prevent rotation of the latter, a plurality of anti-rotation pins (40) may be carried within housing insert (28) and extend through appropriate slots or openings (42), (43) and (44) respectively in the spring (34), sheet (35) and each of the bearing segments (30). As shown in FIG. 6, retaining rings (46) are preferably included to axially locate the bearing assembly (24) relative to the rotating shaft (20).

Figure 7:
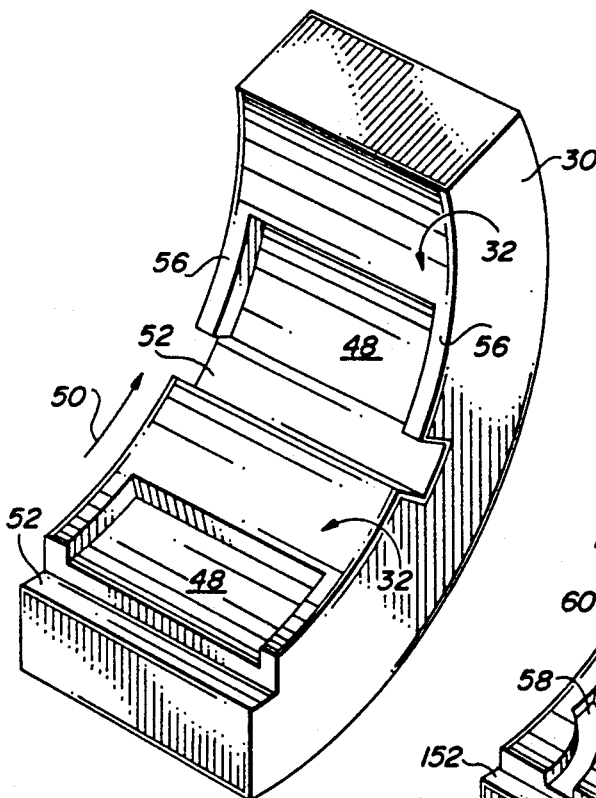
FIG. 7 is an enlarged perspective view of one bearing segment.

The internal surface (32) of each of the carbon graphite bearing segments (30) is configured to self-generate a load carrying gas fluid film in response to high speed rotation of shaft (20). To this end, each bearing segment has a pair of gas receiving pockets or depressions (48) of generally rectangular configuration as illustrated in FIG. 7. Together, the pair of gas receiving pockets (48) on each bearing segment (30) extend about 40% to 60%, and preferably about 50% of the circumferential length of the associated bearing segment such that the three bearing segments (30) together have gas receiving pockets or depressions (48) extending approximately 50% of the entire circumference about the outer surface of ceramic shaft (20). An axial slot (52) extends across the entire axial width of each segment (30), intersecting and opening into the associated depression (48) at the forward end thereof relative to the direction of rotation of shaft (20) which is illustrated by arrow (50) in FIG. 7. Each axial slot (52) is preferably slightly deeper than the associated depression (48). Each slot (52) acts as a source passageway for permitting the flow of hot ambient gas to enter into each associated depression (48). Each depression (48) is of the "shrouded" type inasmuch as upstanding land extensions (54,56) enclosed the opposite axial ends of each gas receiving depression (48). Each land (54) and (56) comprises approximately 5% of the axial width of the bearing segment (30) at each pocket (48). Thus, the axial width of each pocket (48) is approximately 90% of the full axial width of segment (30).

The radial depths of slots (52) and depressions (48), shown somewhat exaggerated for clarity, are chosen so as to provide sufficient flow of gas from the surrounding environment into the pocket (48) so as to permit the self-generation of a load bearing or sustaining gas film between the internal surface (32) of the carbon graphite bearing segments and the outer ceramic surface of shaft (20). Importantly, the segments (30) do not pivot but rather are mounted and loaded to provide a relatively uniform radial clearance between the segments (30) and the outer surface of shaft (20) around the entire circumference thereof. That is, a wedge shaped space is not created between the shaft and the bearing segments (30). To self-generate the load supporting gas film, the present invention relies solely upon the presence of the hot gas within the turbomachinery in depressions (48) to generate a hot gas fluid film between the internal surface (32) and the outer surface of the ceramic shaft (20), all solely in response to the high speed rotation of shaft (20) which sweeps hot gases from depressions (48) into the relatively uniform radial clearance between the surfaces.

It has been found that the combination of materials, i.e., a ceramic outer surface on the shaft (20), along with the carbon graphite of the internal surface of bearing segments (30), cooperate in the present invention to provide a load bearing support which does not require any liquid lubrication whatsoever. The low coefficient of friction of the carbon graphite material when associated with the adjacent ceramic material presents a bearing having a very low break-away torque upon initial rotation of the shaft. Minor excursions, which inevitably occur, had been found not to destroy the bearing even in the absence of oil lubrication. The inert characteristics of the ceramic in the carbon graphite further make it amenable to use in a hot gas, oxygen bearing environment without significant degradation of the material.

It is important to note that the present invention operates by utilizing the surrounding ambient atmosphere to generate the gas film support and does not require introduction of a higher pressure gas into the bearing to generate the gas film support.

The surface finish of the two adjacent surfaces has been found to be important. Preferably the ceramic outer surface of shaft (20) has a very smooth lapped surface finish of eight microinches or less. The carbon graphite internal surface (32) can then be of a more conventional, nonlapped finish of 30 to 60 microinches. As a result, the present invention has been found to operate in the hot gas environment of up to 1,200° F. with the capability of supporting a side load of 10 pounds, and at a shaft speed of 55,000 rpm. In less severe operating conditions simpler arrangements of the present invention, such as solid annulus of carbon-graphite instead of the plurality of segments, have exhibited merit in testing.

The resilient backing spring (34) is sized and configured for damping and stabilization purposes relative to the critical speeds of the rotating element. As such, since it is not an active, primary factor in the development of the gas film support between the adjacently rotating surfaces, the spring (34) can be readily designed for its primary damping purposes for destabilizing cross coupling coefficients without interfering with the dynamic characteristics of the self-generating gas fluid film for support.

Figure 8:
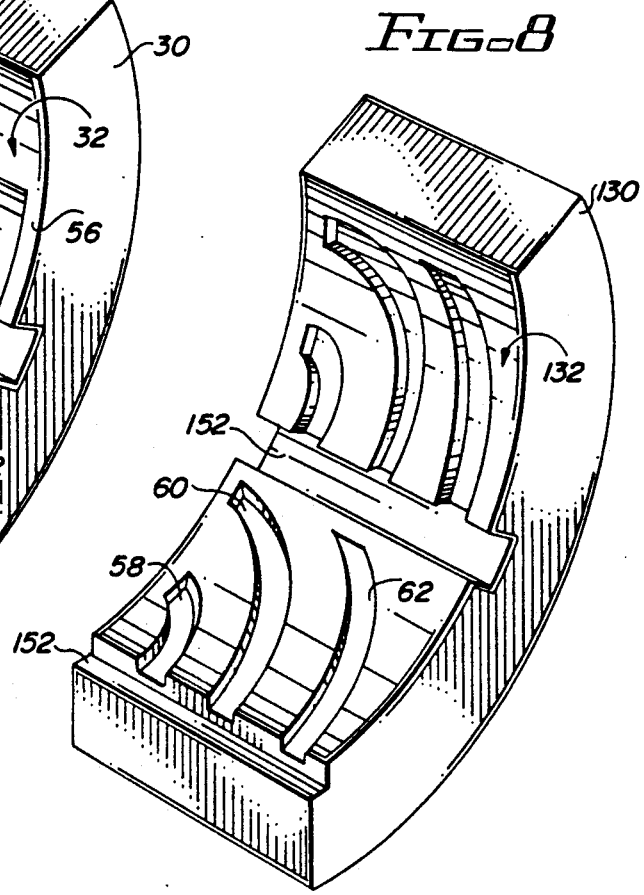
FIG. 8 is a view similar to FIG. 7 but showing an altered arrangement of the film generating recesses in the bearing segment.

FIG. 8 illustrates an alternate arrangement for the gas receiving depressions (48) of FIG. 7 by providing a plurality of spaced, spirally extending grooves (58,60,62) extending upstream from the gas source slots (52). Again, the sum of the volume of the slots (58,60,62) is such as to provide an adequate supply of ambient gas which may be swept across the surface (132) of bearing segment (130) to self-generate a gas film bearing support.

From the foregoing it will be seen that the present invention contemplates an improved method for providing rotational support of a high-speed rotating ceramic shaft disposed in a very hot, oxygen bearing gas environment. Such method includes the steps of providing a very smooth surface finish, about eight microinches, on the ceramic shaft: surrounding the shaft with carbon-graphite segments closely fitting the shaft, with gas-receiving pockets in the segments: generating a flow of gas from the oxygen bearing hot gas atmosphere into these pockets in response to shaft rotation; developing a gas film bearing support between the relatively rotating surfaces from that flow of gas; and, maintaining uniform radial clearance between the surfaces by avoiding pivoting movement of the carbon-graphite segments.

While a preferred arrangement of the invention has been set forth specifically in detail above, it will be apparent to those skilled in the art that various modifications and alterations thereof may be made without departing from the spirit and scope of the invention as set forth in the appended claims.

Having described the invention of sufficient clarity that those skilled in the art may make and use it, what is claimed is:

1. A high speed, non-lubricated bearing assembly for providing rotational support within a stationary housing in a hot gas environment, comprising:
    an axially extending, rotatable shaft having a ceramic outer surface with a lapped, smooth surface finish of approximately 8 microinches or less; and
    a plurality of carbon-graphite bearing segments circumferentially surrounding said shaft, said segments together presenting an inner diameter surface adjacent and uniformly closely fitting said ceramic outer surface, said inner diameter surface of said segments having a non-lapped finish from about 30 to about 60 microinches, each of said segments having a gas receiving pocket on said inner diameter surface, said pocket comprising a depression of rectangular configuration bounded on three sides by lands, and having an axial slot extending the entire axial width of said segment and communicating said unbounded side of said pocket with said hot gas environment on both sides of said bearing, said pockets configured and arranged to self-generate a gas film support between said adjacent inner and outer diameter surfaces upon rotation of said shaft, said axial slot being of sufficient depth and circumferential length to provide adequate hot gas flow into said pocket without additional pressurization to develop the gas film.

2. A bearing assembly as set forth in claim 1, further including means for constraining said segments to said housing to substantially prevent pivoting of said segments toward and away from said inner diameter surface.

3. A bearing assembly as set forth in claim 2, further including means disposed between said segments and said housing for biasing said segments radially inwardly toward said shaft without inducing pivoting of said segments.

4. A bearing assembly as set forth in claim 3 wherein each of said depressions of rectangular configuration extends from about 40% to 60% of the circumferential length of the associated segment.

5. A bearing assembly as set forth in claim 3 wherein each of said depressions of rectangular configuration extends from about 50% of said circumferential length of the associated segment.

6. A bearing assembly as set forth in claim 3, wherein each of said pockets comprises a plurality of spaced, spirally extending grooves.

7. A bearing assembly as set forth in claim 3, wherein said means for biasing comprising a mechanical spring extending substantially around said segments and disposed between said housing and said segments, said spring configured and arranged to exert a substantially uniform, radially inward biasing force on said segments.

8. A bearing assembly as set forth in claim 7 wherein said means for constraining includes pins extending from said housing into each of said segments to prevent rotation of said segments.

9. A bearing assembly as set forth in claim 1, wherein said ceramic outer surface is silicon nitride.

10. A method of providing rotational bearing support capable of withstanding side loads of at least 10 pounds without the use of lubricants for a member rotating at high speeds of more than 20,000 RPM in an oxygen bearing atmosphere of up to approximately 1,200° F., comprising the steps of:
    providing a ceramic outer surface on the rotating member with a lapped, smooth surface finish of about 8 microinches or less;
    surrounding the ceramic outer surface with a plurality of closely fitting carbon graphite segments having a non-lapped surface finish of about 30 to 60 microinches and having depressed pockets facing the ceramic surface;

placing said pockets in fluid communications with said oxygen bearing atmosphere via an axial slot extending the entire width of said carbon graphite segments, said axial slot being of sufficient depth and circumferential length to provide adequate hot gas flow into said pocket without additional pressurization to develop the gas film;

suctioning a flow of gas from said oxygen bearing atmosphere through said axial slot and into said pockets by virtue of rotation of said member;

developing a gas film bearing support between said segments and said ceramic outer surface from said flow of gas; and maintaining relatively uniform clearance between said segments and said member by mounting said segments to a stationary housing to substantially prevent pivoting of said segments toward and away from said member.

11. A method as set forth in claim 10, further including the step of biasing said segments radially inwardly toward said member.

* * * * *